2,850,213

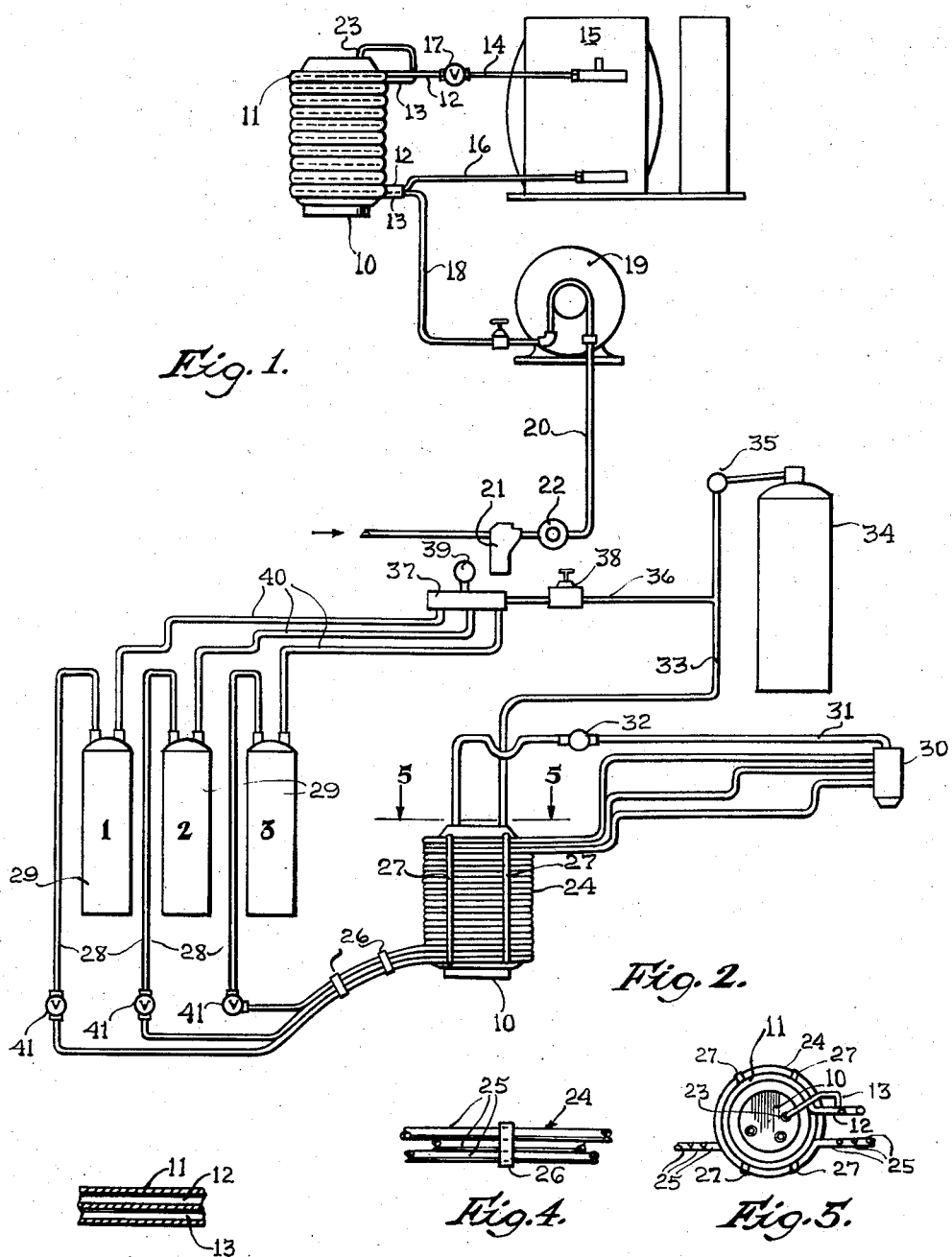

MULTIPLE CARBONATED DRINK DISPENSING APPARATUS

Albert Cole, Miami Beach, Fla.

Application September 27, 1955, Serial No. 536,918

1 Claim. (Cl. 222—129.4)

This invention relates to new and useful improvements in a multiple carbonated drink dispensing apparatus and has for its principal object the provision of an improved construction of this character which will be highly efficient in use and economical in manufacture.

A principal object of this invention is to arrange the various parts of the apparatus in a manner so that when such parts are confined within a housing or enclosure the apparatus will occupy a minimum of space.

In apparatuses of the character to which this invention relates it is desirable to provide an arrangement for maintaining the drink in a pre-cooled state. To accomplish this object it requires the employment of refrigerating the water coils as well as syrup coils. An object of this invention is to associate these coils in such close intimate relationship as will result in maintaining a carbonated drink in pre-cooled condition at the point of dispensing. Ancillary to this object is that of associating these coils in a manner such as will require a minimum area or space within a housing or cabinet enclosing the apparatus.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a schematic diagram of the refrigeration and water system embodied in the invention;

Fig. 2 is a schematic diagram of the syrup and carbonation supply system embodied in the invention;

Fig. 3 is a fragmentary sectional detail view of a portion of one of the coils embodied in the invention;

Fig. 4 is a fragmentary side elevational view of a portion of another coil embodied in the invention; and Fig. 5 is a fragmentary sectional detail view taken substantially on line 5—5 of Fig. 2.

The apparatus embodying my invention is contemplated to be enclosed within a suitable cabinet or housing of a size acceptable for public display. Because of the requirement of maintaining the housing or cabinet of a size acceptable for placement where it may be easily accessible to the public, it is of importance that the mechanism within the housing be such as to occupy a relatively small area. To the accomplishment of these ends I provide a carbonator 10. Closely wound upon this carbonator 10 is a coil 11 formed of suitable non-corroding rustproof material. This coil is made up of a pipe coiled upon a carbonator 10 and comprising non-communicating ducts 12 and 13. The duct 12 by a pipe section 14 is connected to a compressor 15 through which compressor a refrigerant is introduced in the duct 12, and returned therefrom through a pipe section 16 having connection with the opposite end of the duct 12. In the pipe section 14 is arranged a solenoid valve 17 which is temperature controlled so as to permit the operation of the compressor 15 only when the temperature within the duct 12 drops below a predetermined degree.

The duct 13 through a pipe section 18 has connection with a pump 19 in turn connected to a water supply line 20. In this line 20 is a strainer construction 21 and a check valve 22. The oposite end portion of the duct has connection as at 23 to the carbonator 10. From this description it will be apparent that the refrigerant forced through the duct 12 will maintain the water flow through the duct 13 at a predetermined temperature. This is effectively accomplished by reason of the intimate relationship between the ducts 12 and 13. It will also be apparent that the carbonator 10 being in close intimate relation with the coil 11 will be likewise maintained at a predetermined temperature.

Closely wound upon the coil 11 is a syrup supply coil 24. This coil 24 is made up of a plurality of conduits 25 bound together by binding straps 26 at predetermined points in their lengths. These conduits 25 thus bound together as a unit are wound upon the coil 11 and in coil form bound together upon the coil 11 by binding straps 27. Each of the conduits 25 is connected through a pipe section 28 to syrup supply tanks 29. The tanks 29 contain syrup of different flavors. The opposite end portion of the conduits 25 each communicate with a mixing valve 30 of any approved construction. This mixing valve 30 by a line 31 is connected to the carbonator 10 for supplying carbonated water from the carbonator 10 to the mixing valve 30. In the line 31 is a solenoid valve 32 which controls the amount of carbonated water to be delivered to the mixing valve 30.

A line 33 connects the carbonator 10 to a tank 34 which contains a $CO^2$ gas. In this line 33 is arranged a pressure gage 35 which regulates the pressure of the carbonation gas from the tank 34 to the carbonator 10.

The line 33 by a branch line 36 has connection with a distributor valve 37. In this line 36 is a shut-off valve 38. Included as a part of the distributor valve 37 is a gauge 39 by which the pressure of the gas from the tank 34 to the distributor valve 37 may be determined and regulated. The distributor valve 37 by conduits 40 has connection with the syrup tanks 29. The carbonation gas is delivered through conduits to the tanks 29 to pressure feed the syrup through the syrup coil 24.

In each of the pipe sections 28 is incorporated a solenoid valve 41 by means of which a predetermined quantity of syrup is admitted to the mixing valve 30. These solenoid valves 41 as well as the solenoid valve 32 are arranged in a conventional electric circuit in which there is a coin-controlled switch. Such valves are designed to remain open a period of time to allow the proper amount of syrup and carbonated water to flow into the mixing valve 30.

From the foregoing description it will be apparent that by the employment of my simplified multiple drink dispensing apparatus the carbonated water is pre-cooled, and that the arrangement for maintaining the carbonated water pre-cooled is utilized to maintain the syrup and water at a palatable temperature. By such reason of the relationship of the various parts of the apparatus, the same can be conveniently arranged in a cabinet or housing, and when so arranged will occupy a minimum of space. As the various coils are in close intimate relation with respect to each other and with respect to the carbonator, the heat exchange relationship will be of maximum efficiency, greatly reducing the loss of such exchange as is previously experienced in apparatuses now commercially in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A multiple drink vending apparatus comprising a carbonator, a coil intimately embracing the carbonator and comprising a plurality of vertically aligned ducts abutting throughout their longitudinal lengths with the end of one of said ducts communicating with the carbonator, a water supply communicating with the other end of said duct, means for supplying a refrigerant through the other duct, a coil closely embracing said ducts and comprising a plurality of conduits bound together in vertical facial abutting relation with respect to each other and coiled upon said ducts and said carbonator with each of said conduits in facial abutment with said ducts, syrup supply means for communicating with corresponding ends of said conduits, a mixing and dispensing valve common to the opposite ends of said conduits, a carbonated gas supply for said carbonator and for said syrup supply means, a second valve means for regulating the supply of water from said carbonator to said first mentioned valve, solenoid valves in said conduits for controlling the supply of syrup to said mixing and dispensing valve, and a distributor valve controlling the distribution of carbonated gas from said carbonated gas supply means to said syrup supply means, said syrup supply means comprising a plurality of individual supply container tanks, which tanks each contain a different syrup.

References Cited in the file of this patent

UNITED STATES PATENTS

| | | |
|---|---|---|
| 2,035,391 | Lear | Mar. 24, 1936 |
| 2,462,019 | Bowman | Feb. 15, 1949 |
| 2,498,524 | Booth | Feb. 21, 1950 |
| 2,612,357 | Parks | Sept. 30, 1952 |
| 2,617,510 | Little | Nov. 11, 1952 |
| 2,648,274 | Bendfelt | Aug. 11, 1953 |
| 2,653,014 | Sniader | Sept. 22, 1953 |
| 2,721,061 | Freer | Oct. 18, 1955 |